(12) United States Patent
Palmer

(10) Patent No.: US 9,939,025 B2
(45) Date of Patent: Apr. 10, 2018

(54) MANUAL OR ELECTRIC GRAIN MILL

(76) Inventor: Dustin W. Palmer, Orem, UT (US)

( * ) Notice: Subject to any disclaimer, the term of this patent is extended or adjusted under 35 U.S.C. 154(b) by 506 days.

(21) Appl. No.: 13/494,495

(22) Filed: Jun. 12, 2012

(65) Prior Publication Data

US 2013/0327867 A1 Dec. 12, 2013

(51) Int. Cl.
*A47J 42/14* (2006.01)
*F16D 1/10* (2006.01)

(52) U.S. Cl.
CPC ........ *F16D 1/101* (2013.01); *F16D 2001/102* (2013.01); *Y10T 29/49002* (2015.01)

(58) Field of Classification Search
CPC . A47J 42/14; B02C 18/38; B02C 9/00; F16D 1/101; F16D 2001/102; Y10T 29/49002
USPC ........ 241/82.1, 101.1, 101.2, 169.1
See application file for complete search history.

(56) References Cited

U.S. PATENT DOCUMENTS

| | | | |
|---|---|---|---|
| 5,970,860 A | * | 10/1999 | Yip .................................. 99/510 |
| 2006/0016921 A1 | * | 1/2006 | Vacha ........................... 241/82.1 |
| 2011/0284670 A1 | * | 11/2011 | Jenkins et al. ..................... 241/6 |

FOREIGN PATENT DOCUMENTS

WO    WO 2004047994 A1 * 6/2004 ............. B02C 18/30

OTHER PUBLICATIONS

Pragotrade Inc., Manual Cuber/Tenderizer and Manual Jerky Slicer Motor Attachment, May 3, 2007.*
Victorio Kitchen Products Inc., Food Straner, Copyright 2012, pp. 12-19.*
Victorio Kitchen Products, Inc., Deluxe Grain Mill, Copyright 2013, pp. 12-19.*

* cited by examiner

*Primary Examiner* — Mark Rosenbaum
(74) *Attorney, Agent, or Firm* — Dax D. Anderson; Kirton McConkie

(57) ABSTRACT

Some embodiments of an exemplary manual or electric grain mills may include a mill body; a mill mechanism disposed within the mill body, the mill mechanism including a mill shaft and a shaft coupling; a hand crank having a hand crank driveshaft configured to be selectively coupled to the shaft coupling to drive the mill mechanism when the hand crank is manually operated; and a motor assembly. The motor assembly may include a motor housing, a motor disposed within the motor housing, and a motor driveshaft operatively coupled to the motor, the motor driveshaft being configured to be selectively couple to the shaft coupling and drive the mill mechanism when the motor is powered.

20 Claims, 8 Drawing Sheets

MANUAL OR ELECTRIC GRAIN MILL

FIELD

This application relates generally to milling grains. More specifically, this application relates to a grain mill that can be selectively driven either by a motor or manually.

BACKGROUND

Grinding mills have been used for centuries to break solid materials into smaller pieces. Among other uses, grinding mills are commonly used to grind dry grains and spices, such as wheat, corn, oats, rice, peppercorn, and barley. Grinding mills intended for grains are commonly called grain mills. Ground grains and spices may have varied grain sizes based on the configurations of the grinding mill. For example, wheat and other grains may be coarsely ground and eaten as a cereal or finely ground into flour and used for baking. Because many grains have a long storage life they are common food storage items. However, the storage life of grains is increased greatly in kept in whole-grain form prior to milling, making storing unmilled grains a useful part of a long-term food storage plan.

Because many grains are best stored unmilled, along with a store of grain, many households have a grain mill that they may use to grind stored grain. However, currently people with household grain mills must choose between electric and manual grain mills, or have both. In the event of an emergency that might require a grain mill, there may not be electricity making electric grain mills useless in such circumstances. On the other hand, a manually-operated grain mill is time consuming and hard work. Thus, it may be costly or difficult to choose which type of grain mill to choose or whether to purchase and store both.

SUMMARY

Exemplary manual or electric grain mills and methods of using such mills are disclosed. Some embodiments of an exemplary manual or electric grain mills may include a mill body; a mill mechanism disposed within the mill body, the mill mechanism including a mill shaft and a shaft coupling; a hand crank having a hand crank driveshaft configured to be selectively coupled to the shaft coupling to drive the mill mechanism when the hand crank is manually operated; and a motor assembly. The motor assembly may include a motor housing, a motor disposed within the motor housing, and a motor driveshaft operatively coupled to the motor, the motor driveshaft being configured to be selectively couple to the shaft coupling and drive the mill mechanism when the motor is powered.

In some embodiments, the grain mill may further include a support arm extending outwardly from the motor housing, the support arm being configured to prevent rotation of the motor with respect to the mill body when the motor is powered. Similarly, the support arm may include a bend configured to at least partially wrap around the mill body. The bend of the support arm may be at an angle of between about 60 and about 120 degrees depending on the configuration of the grain mill to which it is to be attached.

In some embodiments, the motor housing may have a substantially flat surface, the substantially flat surface being configured to abut a portion of the mill body when the motor driveshaft is selectively coupled to the shaft coupling. The support arm and the motor driveshaft may each at least partially extends outwardly from the substantially flat outer surface of the motor housing. Similarly, the hand crank driveshaft and the motor driveshaft each include a shaft feature configured to selectively interlock with the mill coupling. The hand crank may also include a handle extending away from the hand crank driveshaft. The motor assembly may be configured to be operably coupled to the mill body by inserting the motor driveshaft into shaft coupling and rotating the motor housing into contact with the mill body. A portion of the mill body may further include a mounting mechanism for mounting the device to a surface or other location.

In some embodiments, a motor assembly for use with a grain mill may include: a motor housing having a substantially flat surface; a driveshaft extending outwardly from the substantially flat surface, the driveshaft being configured to selectively coupled to a milling mechanism of a grain mill and to rotate in a first direction to drive the milling mechanism; and a support arm extending outwardly from the substantially flat surface, the support arm being configured to prevent rotation of the motor housing with respect to a body of the grain mill when the grain mill is being used to mill grain. In some such embodiments, the motor housing may be freely rotatable away from a portion of the body of the grain mill when the motor is not being operated, and the support arm may include a bend configured to wrap around at least a portion of the body of the grain mill.

A method of selectively attaching a motor or a hand crank to a grain mill may include: providing a grain mill having a mill body housing and a milling mechanism, the milling mechanism having a mill coupling; providing a motor assembly having a motor driveshaft extending therefrom; inserting the motor driveshaft into the mill coupling to operably couple the motor driveshaft to the milling mechanism, the motor driveshaft being configured to rotate in a first direction; and rotating the motor assembly about the driveshaft in the first direction until an arm of the motor assembly contacts the mill body. In some embodiments, the method may include removing the motor assembly from the mill body and attaching a hand crank to the mill body to allow manual rotation of the milling mechanism.

BRIEF DESCRIPTION OF THE DRAWINGS

The following description can be better understood in light of Figures, in which.

Figure 1:
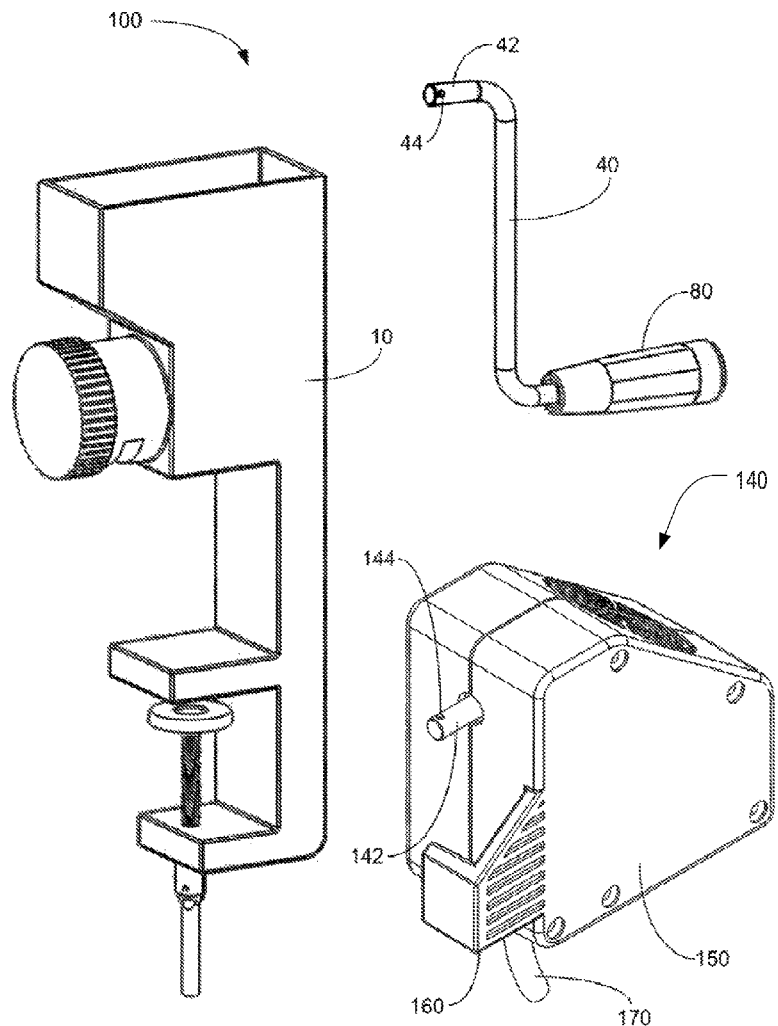
FIG. 1 is a perspective view of a representative grain mill having a hand crank and a motor.

Together with the following description, the Figures demonstrate and explain the principles of manual or electric grain mills and methods for making and using the manual or electric grain mills. In the Figures, the thickness and configuration of components may be exaggerated for clarity. The same reference numerals in different Figures represent the same component.

DETAILED DESCRIPTION

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry. For example, while the description below focuses on a counter-top mounted conical grain grinder, other types of grinders may be modified as described below to be either manual or electrically driven, such as pepper grinders, coffee grinders, meat grinders, etc., and grinders of various grinding surface configurations.

In addition, as the terms on, disposed on, attached to, connected to, or coupled to, etc. are used herein, one object (e.g., a material, element, structure, member, etc.) can be on, disposed on, attached to, connected to, or coupled to another object—regardless of whether the one object is directly on, attached, connected, or coupled to the other object or whether there are one or more intervening objects between the one object and the other object. Also, directions (e.g., on top of, below, above, top, bottom, side, up, down, under, over, upper, lower, lateral, orbital, horizontal, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

FIG. 1 illustrates manual or electric grain mill kit 100 according to some embodiments. Grain mill kit 100 may include grain mill 10, hand crank 40, and electric motor assembly 140. Hand crank 40 or motor assembly 140 may be selectively attached to grain mill 10 to drive grain mill 10, depending on a desired application or circumstance. For example, grain mill 10 may be used frequently at home using motor assembly 140 to mill flour, or may be used with hand crank 40 in a camping, emergency, or other situation where electricity may not be available. By providing both a hand crank and a motor, a single grain mill may be used in a variety of situations. Each of hand crank 40 and motor assembly 140 may include similar driveshafts for selectively coupling to the milling mechanism of grain mill 10 such that either hand crank 40 or motor assembly 140 may be used to operate grain mill 10 as desired.

Figure 2:
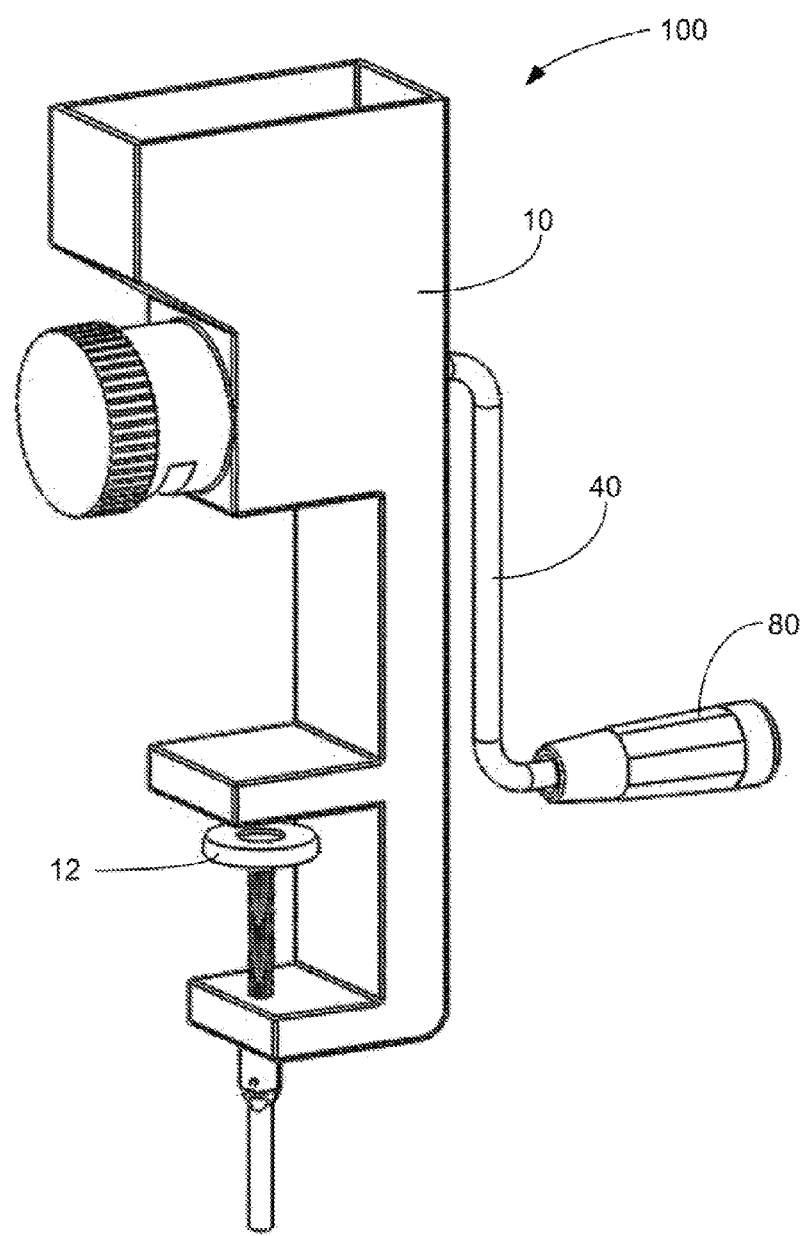
FIG. 2 is a perspective view of a representative grain mill with a hand crank attached.
Figure 3:
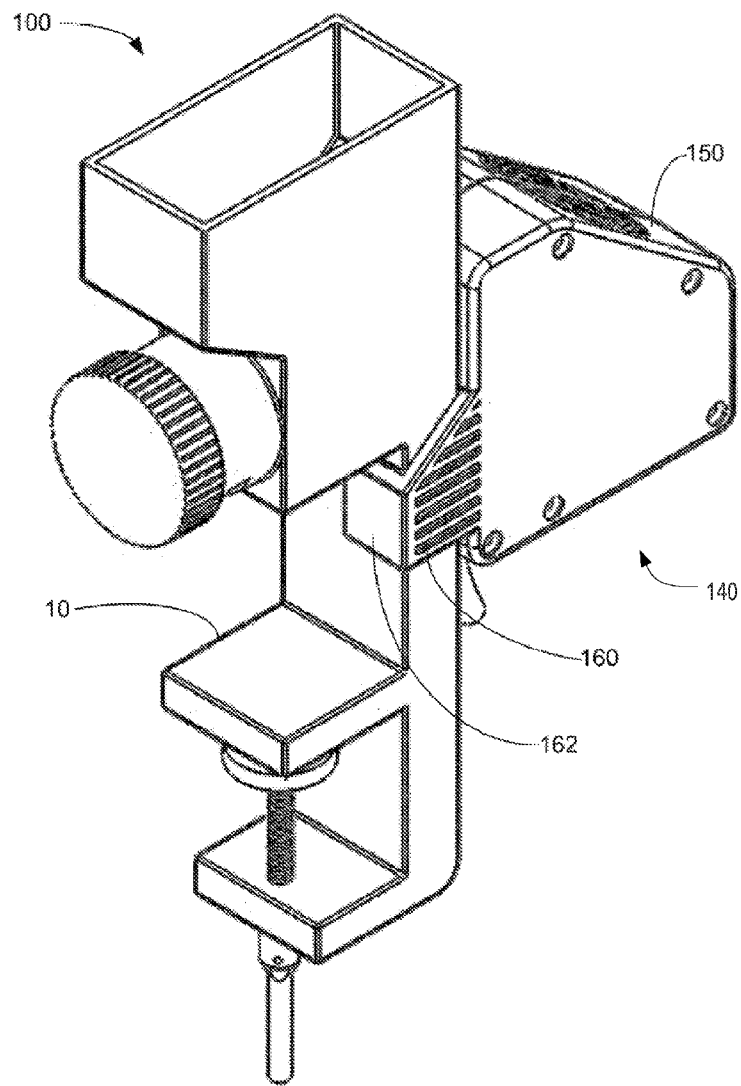
FIG. 3 is a perspective view of a representative grain mill with a motor assembly attached.
Figure 4:
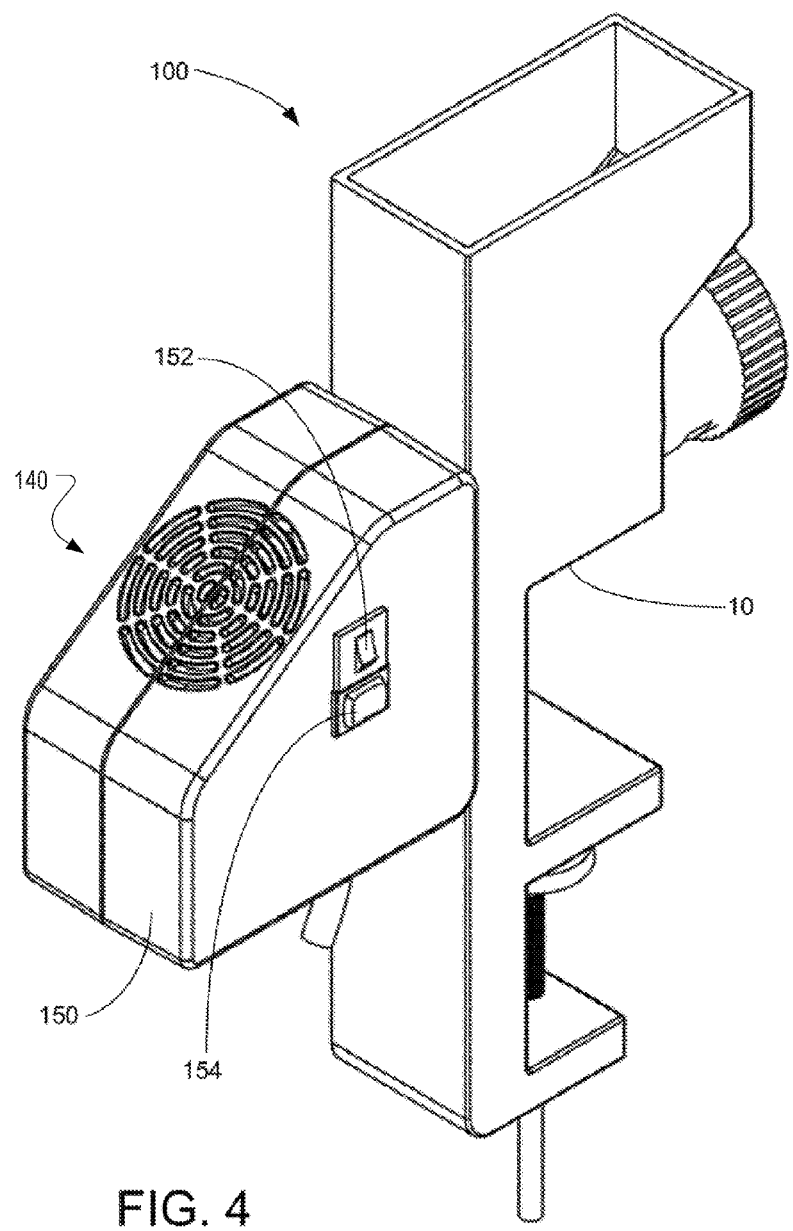
FIG. 4 is a rear perspective view of the grain mill and motor assembly of FIG. 3.
Figure 5:
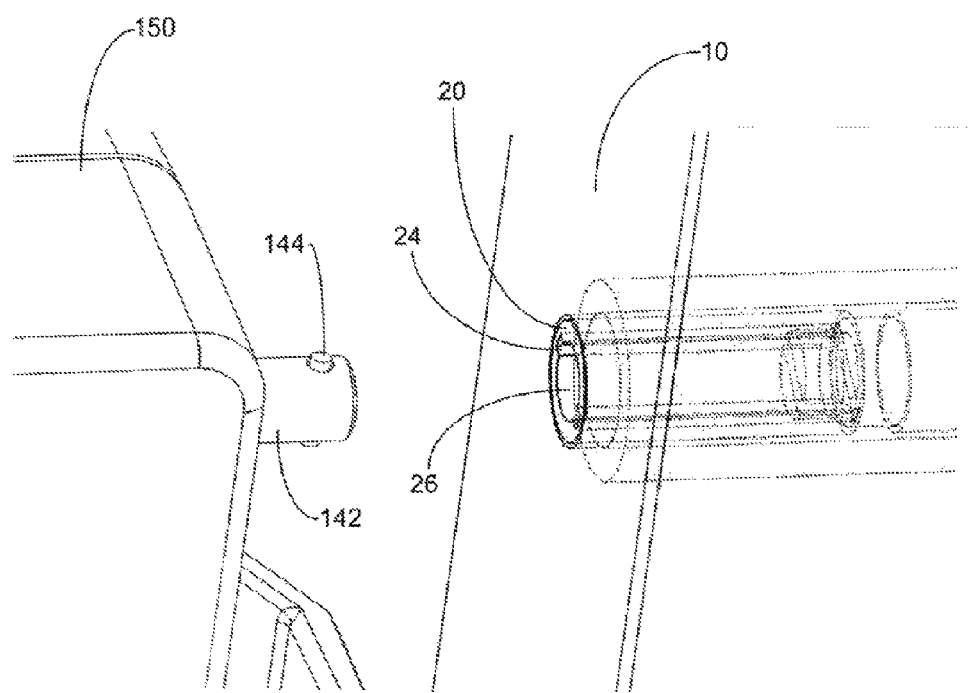
FIG. 5 is a partial perspective view of an attachment mechanism between a representative motor and a grain mill.
Figure 6:
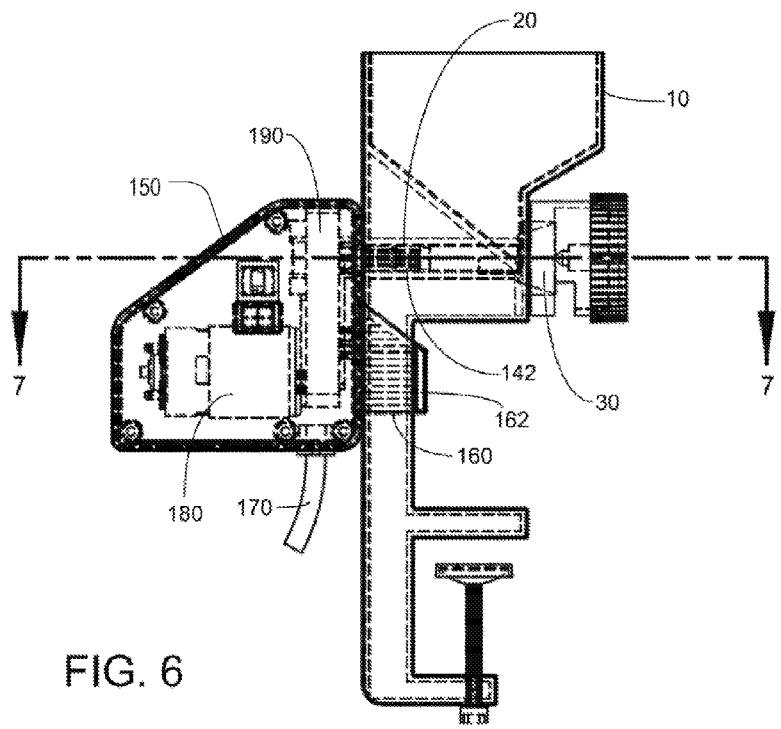
FIG. 6 is a side view with internal features of a representative motor assembly attached to a grain mill.

As shown in FIG. 2, grain mill kit 100 may be configured as a manually operated grain mill in some embodiments. In such embodiments, hand crank 40 may be attached to grain mill 10 by inserting hand crank driveshaft 42 into opening 26 of mill shaft 20 (FIG. 6). Hand crank driveshaft 42 and motor driveshaft 142 may each include an interlocking feature 44, 144 to rotationally interlock with mill shaft 20, as described in further detail below. Hand crank 40 may include handle 80. Handle 80 may be configured to permit manual rotation of hand crank 40 to rotate a milling mechanism of grain mill 10. Hand crank 40 may be formed in a crank shape like a modified "s" shape with hand crank driveshaft 40 extending in one direction and handle 80 extending in an opposite direction.

Grain mill 10 may be coupled to a countertop or board (not shown) using mount 12. Grain mill 10 may include a hopper, adjustment mechanism, and other features of grain mills, such as a milling assembly 30. In some embodiments, grain mill 10 may be adjustable to allow for milling of different sizes and types of grains and also to vary the fineness of the flour ground using the mill. Grain mill 10, or various pieces of grain mill 10, may be formed of any suitable material, such as metal, plastic, stone, ceramics, or any other suitable material, or combinations of suitable materials.

FIGS. 3-7 illustrate grain mill kit 100 configured with motor assembly 140 attached to grain mill 10. In some embodiments, motor assembly 140 may include housing 150, arm 160, cord 170, motor 180, and transmission 190. Arm 160 may be integrally formed with housing 150, or may be separately attached. Arm 160 may also include bend 162. Bend 162 may be formed to cooperate with structural features of grain mill 10 such that motor assembly 140 may be held against a portion of grain mill 10 when motor assembly 140 is in use. As such, bend 162 may be about 90 degrees from arm 160 as illustrated, but may also be other angles depending on the configuration of the grain mill to which it may be attached. For example, bend 162 may be between about 30 and 120 degrees on various applications.

Arm 160 and bend 162 may cooperate with a portion of grain mill 10 to hold motor assembly 140 in place during milling operations. For example, as shown in the figures, when motor driveshaft 142 is engaged with mill shaft 20 to turn mill assembly 30, the rotation of motor 180 may press arm 160 against a portion of grain mill 10 and bend 162 may wrap around a portion of grain mill 10 to keep motor assembly 140 in secure, operational contact with grain mill 10.

Figure 9:
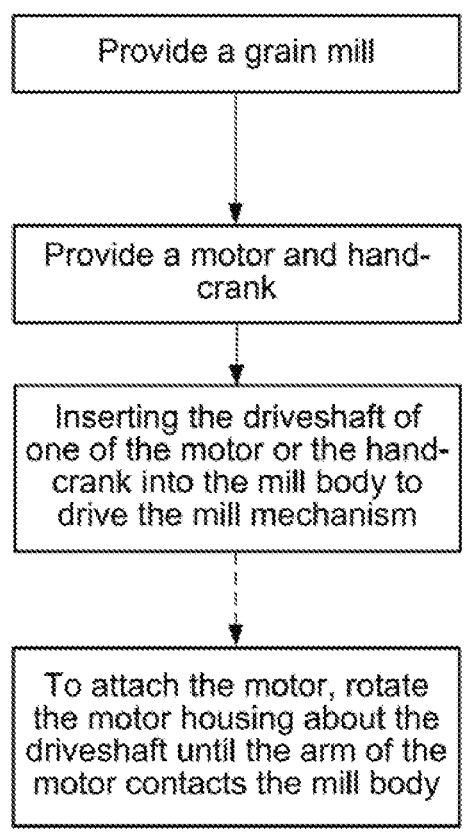
FIG. 9 is a flowchart of a method of attaching a motor or hand crank to a grain mill.

In some embodiments, both hand crank 40 and motor assembly 140 may be easily selectively coupled to grain mill 10 without the use of fasteners or tools, such as by employing the method shown in FIG. 9. For example, to attach motor assembly 140 to grain mill 10, motor drive shaft 142 may be inserted into opening 26 of mill shaft 20 and interlocking feature 144 may be aligned with groove 24 in mill shaft 20. Motor assembly 140 may then be rotated until arm 160 engages with a portion of grain mill 10, preventing any further rotation. Activating motor 180 may then provide torque to motor driveshaft 142 further holding arm 160 against grain mill 10 securely without the need of fasteners while bend 162 may then prevent motor assembly 140 from being moved to withdraw motor driveshaft 142 out of mill shaft 20.

Interlocking feature 144 may cooperatively operate with groove 24 to transfer rotational energy of motor driveshaft 142 to mill shaft 20 and thereby to milling assembly 30. In the Figures, interlocking feature 144 is shown as a pin through motor driveshaft 142 (with a similar feature on the hand crank driveshaft) that cooperates with groove 24. In some embodiments, motor driveshaft 142 may be formed with any non-round cross-section and opening 26 may have a cooperative cross-section to allow rotation of motor driveshaft 142 to be transferred to mill shaft 20, such a triangular, hexagonal, square, plus-shaped, etc.

Figure 7:
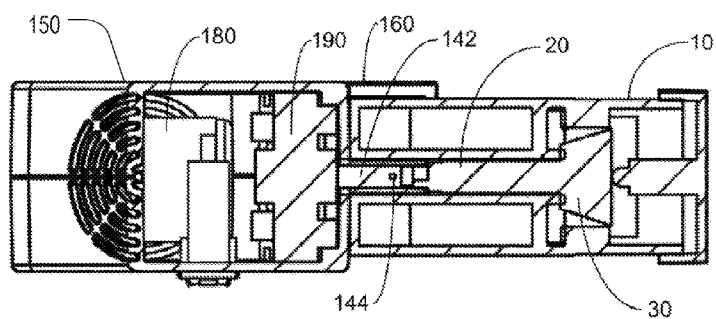
FIG. 7 is a cross-section view of the motor and grain mill of FIG. 7, taken along line 7-7 of FIG. 6.
Figure 8:
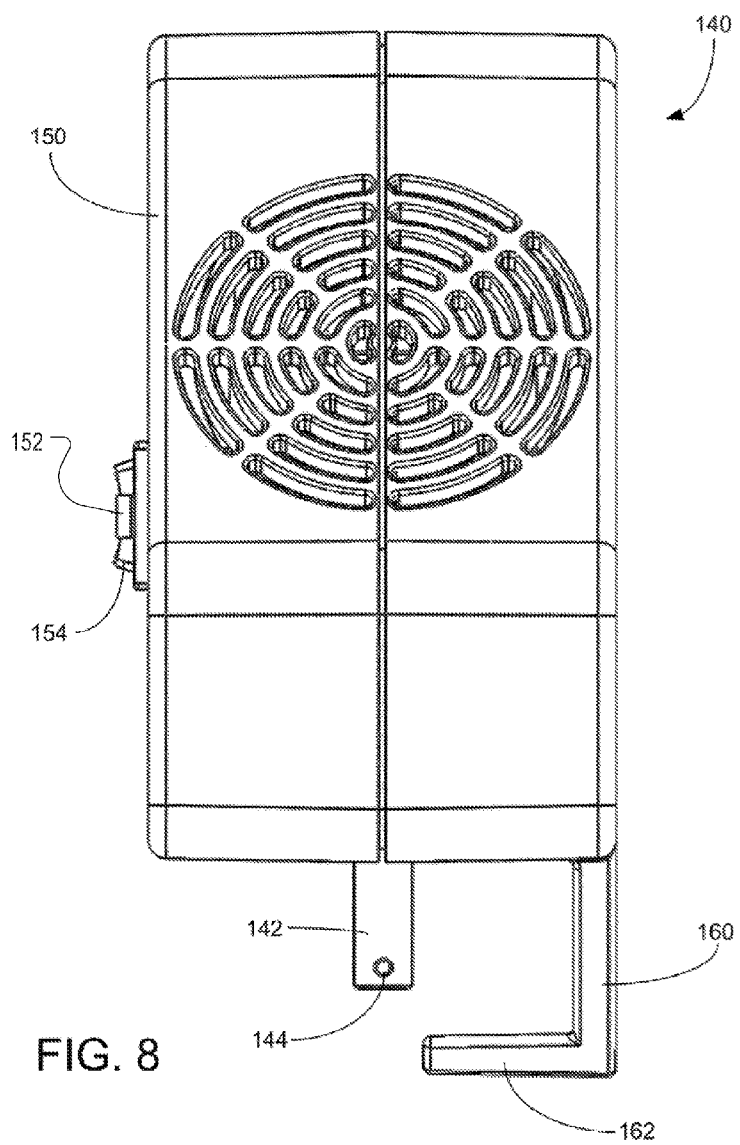
FIG. 8 is a top view of an exemplary motor assembly.

FIGS. 6-8 particularly illustrate various features of embodiments of motor assembly 140. Motor 180 may be held within motor housing 150 and operationally coupled to transmission 190. Transmission 190 may then be operationally coupled to motor driveshaft 142. Transmission 190 may provide gearing reductions to allow motor 180 to spin at an optimal speed and also rotate motor driveshaft 142 with a different speed, as desired. In the illustrated embodiments, motor 180 may be powered with a plug-in AC or DC power source through cable 170. In other embodiments, motor assembly 140 may also include batteries (not shown) for emergency use. Motor assembly 140 may be operated with switches 152, 154. In some embodiments, only one, on-off switch may be used. In other embodiments, two switches may be used for on-off and two different speed settings, or the two switches may be for on-off and a pulse feature, or may provide a reverse to assist in freeing a stuck grinding mechanism, or any other desired motor function.

The various components of motor assembly 140, such as arm 160, or housing 150, or both may be formed of plastic, metal, or other suitable material that can be formed into an appropriate shape to function as described herein. Similarly, motor 180 and transmission 190 may be conventional appliance motor and transmission, or may be designed with a size and power to adequately drive grain mill 10 as desired.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A grain mill comprising:
   a mill body;
   a mill mechanism disposed within the mill body, the mill mechanism including a mill shaft and a shaft coupling;
   a hand crank having a hand crank driveshaft configured to be selectively coupled to the shaft coupling to drive the mill mechanism when the hand crank is manually operated; and
   a motor assembly, the motor assembly having,
   a motor housing,
   a motor disposed within the motor housing,
   a motor driveshaft operatively coupled to the motor, the motor driveshaft being configured to be selectively coupled to the shaft coupling and drive the mill mechanism when the motor is powered,
   a support arm extending outwardly from the motor housing, the support arm being configured to prevent rotation of the motor assembly with respect to the mill body when the motor is powered, and
   a bend on the support arm, the bend configured to at least partially wrap around the mill body to prevent the motor assembly from being moved to withdraw the motor driveshaft from the shaft coupling.

2. The grain mill of claim 1, wherein the motor assembly further comprises a transmission disposed within the motor housing, the transmission configured to provide gearing reductions to allow the motor and the motor driveshaft to run at different speeds.

3. The grain mill of claim 1, wherein the support arm and the bend are configured to rotationally engage against the mill body.

4. The grain mill of claim 1, wherein the bend of the support arm is at an angle of between about 75 and about 105 degrees.

5. The grain mill of claim 1, wherein the motor housing has a substantially flat surface, the substantially flat surface being configured to about a portion of the mill body when the motor driveshaft is selectively coupled to the shaft coupling.

6. The grain mill of claim 1, wherein the support arm and the motor driveshaft each at least partially extends outwardly from substantially flat outer surface of the motor housing.

7. The grain mill of claim 1, wherein the hand crank driveshaft and the motor driveshaft each include a shaft feature configured to selectively interlock with the mill coupling.

8. The grain mill of claim 1, wherein the hand crank includes a handle extending away from the hand crank driveshaft.

9. The grain mill of claim 1, wherein the motor assembly is configured to be operably coupled to the mill body by inserting the motor driveshaft into the shaft coupling and rotating the motor housing into contact with the mill body.

10. The grain mill of claim 1, wherein the mill body further comprises a mounting mechanism.

11. A grain mill configured to be selectively driven by a motor or a hand crank, the mill comprising:
    a mill body comprising a mill shaft connected to a shaft coupling;
    a hand crank comprising a hand crank driveshaft configured to be selectively coupled to the shaft coupling to drive the mill shaft when the hand crank is manually rotated;
    a motor housing comprising a motor operatively coupled to a transmission, the transmission being operatively coupled to a driveshaft, the driveshaft being configured to be selectively coupled to the shaft coupling and drive the mill shaft when the motor is powered; and
    a support arm extending outwardly from the motor housing, the support arm comprising a bend at a distal end,
    wherein the support arm and bend are configured to rotationally engage with the mill body when the motor is powered to prevent rotation of the motor housing with respect to the mill body and to prevent the motor housing from being moved to withdraw the driveshaft from the shaft coupling.

12. The grain mill of claim 11, wherein the motor and transmission are disposed within the motor housing.

13. The grain mill of claim 11, wherein the transmission is configured to provide gear reduction to allow the motor and the driveshaft to run at different speeds.

14. The grain mill of claim 11, wherein the motor housing further comprises a switch to operate the motor.

15. The grain mill of claim 11, wherein the motor housing further comprises batteries configured to power the motor.

16. The grain mill of claim 11, wherein the bend of the support arm is at an angle of between about 75 and about 105 degrees.

17. The grain mill of claim 11, wherein the mill is adjustable to allow milling of different sizes and types of grain and to vary the fineness of the flour produced by the mill.

18. A mill configured to be selectively driven by a motor or a hand crank, the mill comprising:
a mill body comprising a shaft coupling;
a hand crank configured to be selectively coupled to the shaft coupling to drive a mill mechanism when the hand crank is manually rotated;
a motor housing comprising a motor operatively coupled to a driveshaft, the driveshaft being configured to be selectively coupled to the shaft coupling to drive the mill mechanism when the motor is powered; and
a support arm extending outwardly from the motor housing, the support arm comprising a bend at a distal end,
wherein the bend prevents the motor housing from being moved away from the mill body to withdraw the driveshaft from the shaft coupling when the motor is powered.

19. The mill of claim 18, wherein the motor is configured to press the support arm against the mill body when the motor is powered.

20. The mill of claim 18, wherein the mill is configured to mill one or more of grain, pepper, coffee, and meat.

\* \* \* \* \*